Dec. 7, 1937.  W. B. EWING  2,101,707
RAILING AND MANUFACTURE THEREOF
Filed Nov. 6, 1934
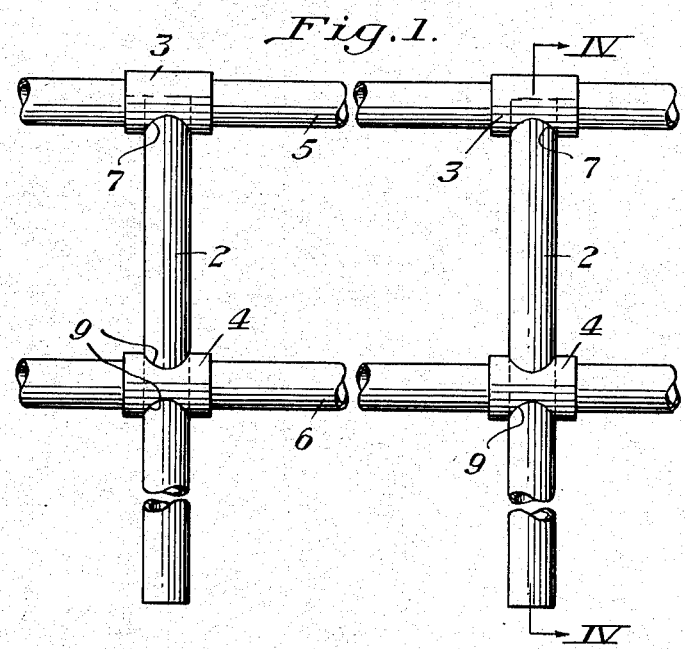
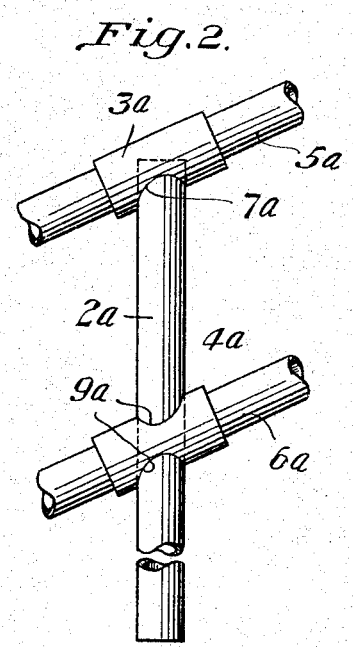
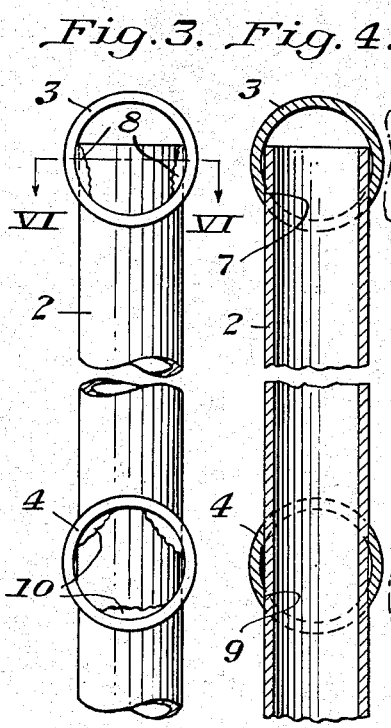
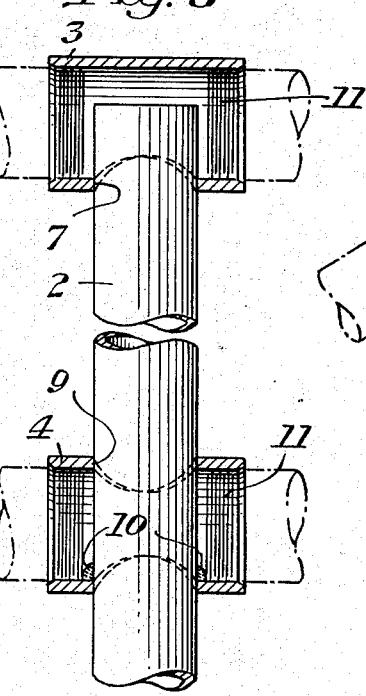
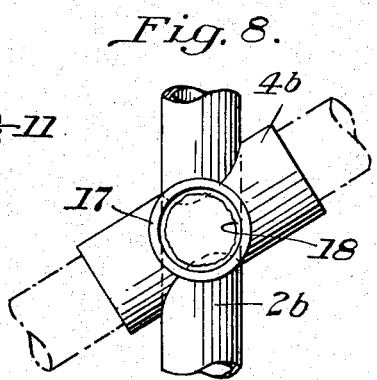
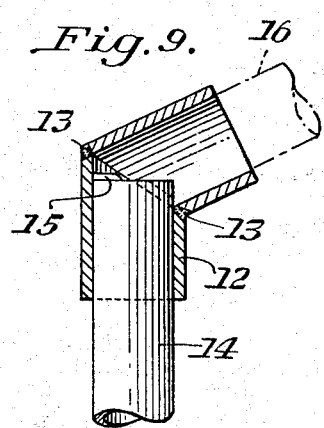
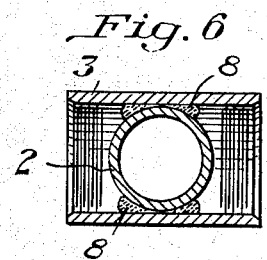
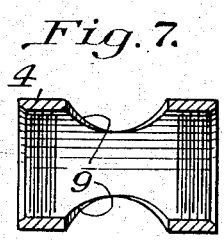

Patented Dec. 7, 1937

2,101,707

UNITED STATES PATENT OFFICE 2,101,707

RAILING AND MANUFACTURE THEREOF

Wylie B. Ewing, Wheeling, W. Va., assignor, by mesne assignments, to Vulcan Rail and Construction Company, Maspeth, N. Y., a corporation of New York Application November 6, 1934, Serial No. 751,717

21 Claims. (Cl. 29—148.2)

This invention relates broadly to railing and the manufacture thereof. It relates more particularly to railing comprising composite tubular structures primarily adapted for structural uses such, for example, as hand railing, guard railing and the like. The invention further relates to certain improved methods of manufacturing railing, and particularly tubular railing, and to certain novel features of structures of such character.

Purely for the purposes of illustration and explanation the invention will be described in connection with the manufacture of a hand railing such as may be used for bridges, sidewalks, etc. Railings of this character are ordinarily made of pipe sections and fittings connected together in much the same way as for a conduit. Cast fittings are ordinarily used and the pipe sections threaded into the fittings. In some cases the component parts are welded together in the field. If the railing is to extend at an angle to the horizontal, as along a flight of steps, special fittings must be used. If a lower rail parallel to the top rail is to be employed the uprights are usually each split into two short sections, one above and one below the intermediate fitting, for receiving the lower rail.

I provide a composite tubular structure which, though having a wide variety of uses, is particularly well adaptable for use in the construction of hand railings and which has certain important advantages over hand railings of the type referred to above. In my construction the connecting or fitting portions are preferably of wrought steel and hence are much stronger than the malleable castings heretofore commonly used. My construction may be assembled in sections in the shop and the fitting portions are preferably welded to the pipe sections, the construction being of such a character that the welding can be effected integrally of the structure, thus avoiding the necessity of grinding or finishing of the weld. My construction is considerably cheaper than the railings previously in use while at the same time stronger. All field welding may be eliminated as the sections may be completely welded in the shop before being shipped out. Any grinding or finishing of the weld which may in some cases be necessary or desirable may thus be done with shop equipment, enabling the work to be accomplished much more efficiently than it can be done in the field.

The fitting portions are preferably made out of standard wrought seamless stock, portions of such stock being shaped for connection with continuous uprights even though one or more rails parallel to the upper rail are employed. The use of continuous uprights unbroken by intermediate fittings further greatly strengthens the construction. Still further, when the railing is to extend at an angle to the horizontal the fitting portions may be made out of the standard stock with little or no difficulty than for horizontal railings. This eliminates the great expense in connection with special cast fittings. Also, the railing is relatively strong and compact as compared with railing made with cast fittings. Cast fittings are weaker than my wrought fitting portions but nevertheless consume more space and utilize a greater weight of metal.

A railing may be made up in accordance with my invention in a very short time and it is not necessary to carry any special parts at all in stock. Ordinarily the entire railing can be fabricated from pipe or tubing of only two sizes, and if an adequate supply of these sizes in the usual lengths is maintained the complete railing can be fabricated therefrom in a very short time. The invention is adaptable for the construction of railings of a wide variety of sizes and its adaptability is well nigh limitless. While ordinarily pipe of substantial size is employed for the railing, I have used in the claims the word "tubing", such word being used in a definitive and not a limitative sense and being intended to comprehend any suitable tubular stock of whatever size.

The features and advantages of the invention referred to above are intended to be illustrative only, and other details, objects and advantages of the invention will become apparent as the following description of certain present preferred embodiments thereof proceeds.

In the accompanying drawing I have shown certain present preferred embodiments of the invention, in which Figure 1 is an elevational view of a railing construction with portions cut away;

Figure 2 is an elevational view of a railing construction similar to that shown in Figure 1 but in which the rails extend at an angle to the horizontal;

Figure 3 is a longitudinal elevational view, to enlarged scale and with portions cut away, of one of the upright sections shown in Figure 1 with the rails removed;

Figure 4 is a transverse cross-sectional view to enlarged scale, taken on the line IV—IV of Figure 1;

Figure 5 is a longitudinal cross-sectional view, to enlarged scale and with portions cut away, through one of the upright members shown in Figure 1;

Figure 6 is a horizontal cross-sectional view taken on the line VI—VI of Figure 3;

Figure 7 is a central vertical longitudinal cross-sectional view through the lower fitting portion shown in Figure 5;

Figure 8 is an elevational view of a modified form of construction having branches extending in two lateral directions; and Figure 9 is a vertical cross-sectional view through an elbow construction.

The stock used is of any preferred character and may be either circular or non-circular in cross-section. Circular stock has been selected for the purpose of illustration. Ordinarily the stock will be of wrought steel, either seamless or welded. In the embodiments shown in the drawing almost all of the railing is made up from standard pipe of two sizes,—one size for the uprights and rails and a slightly larger size for the fitting portions. The relationship between the two sizes of pipe is preferably such that when the smaller size is externally threaded and the larger size is internally threaded the smaller size pipe may be screwed into the larger size pipe. However, in some cases the relationship may be such that the smaller size pipe has a sliding fit within the larger size pipe, as in the elbow construction shown in Figure 9.

Referring now more particularly to Figures 1 and 3 to 7, inclusive, I provide a railing comprising uprights 2, fitting portions 3 for the top rail, fitting portions 4 for the lower rail, top rail sections 5 and lower rail sections 6. The uprights 2 and the rails 5 and 6 are of the same cross section and unbroken throughout. The fitting portions 3 and 4 are applied to the exterior of the uprights. Each of the fitting portions 3 has a hole 7 drilled through its wall on an axis perpendicular to and intersecting the axis of the fitting portion and of a size to snugly receive the top of the corresponding upright 2. The top of the upright is introduced within the hole 7 preferably until its upper edge strikes the upper portion of the interior of the fitting, as shown in Figures 3 and 4. This is preferably done by pressing if the hole 7 is of such size as to fit tightly about the exterior of the upright. When a pressed fit is employed this alone produces a joint which is strong and accurately aligned and of pleasing appearance. Whether or not a pressed fit is employed it is ordinarily preferable to weld the fitting portion to the upright, such, for example, as indicated at 8 in Figures 3 and 6. As shown, the welding is of the deposit type and is done entirely internally of the structure and cannot be seen from without after the railing is completed and produces a very strong structure without the necessity of any external finishing.

The fitting portions 4 for the lower rail are made and applied similarly to the fitting portions 3 except that a hole 9 is drilled all the way through each of the fitting portions 4, passing through opposite wall portions thereof. A cross section through one of the fitting portions 9 is shown in Figure 7. These portions are also applied to the uprights, preferably by pressing, and are preferably welded to the uprights internally, as shown at 10 in Figure 5.

The upright sections comprising the uprights 2 and the fitting portions 3 and 4 are completely fabricated in the shop. Ordinarily each end of each of the fitting portions will be internally threaded as shown at 11 in Figure 5 so that the rail sections can be threaded thereinto. It may, however, be desirable to otherwise connect the upright sections and the rail sections, as by welding, in which case this welding would be done in the field, at least as to some of the connections. When threaded connections are used the ends of the rail sections are externally threaded to correspond with the internal threading of the fitting portions, although when no threading is employed the relative sizes of the pipes are such as to permit of a sliding fit as shown in Figure 9. In this figure a composite elbow 12 is made up by welding together at 13 two properly cut sections of stock of the larger size, an upright 14 being introduced into the downwardly extending leg of the elbow and welded therein as at 15. The upwardly and angularly extending leg of the elbow may also make a sliding fit with the adjacent rail section indicated in chain lines at 16 or a threaded fit may be provided for by making the elbow of two pieces of stock of slightly different size, the upwardly and angularly extending leg of the elbow being slightly smaller to permit of a threaded connection with the rail section.

The construction shown in Figure 2 is the same as that shown in Figure 1 except that the rail sections extend at an angle to the horizontal. In Figure 2 the upright is shown at 2a, the upper fitting portion at 3a, the lower fitting portion at 4a, the upper rail sections at 5a and the lower rail sections at 6a. The respective holes 7a through the upper fitting portion and 9a through the lower fitting portion are drilled on axes intersecting the longitudinal axes of the fitting portions but at an acute angle thereto. The component parts are welded together as above explained. This provides a strong rigid structure for use on a grade or as a safety railing for steps.

A further modified form of construction is shown in Figure 8 in which the upright is indicated at 2b, the longitudinal fitting portion at 4b and an extra transverse fitting portion at 17. The construction of Figure 8 is similar to that of Figure 2 except that the transverse fitting portion 17 is applied to the structure shown at the lower portion of Figure 2 and also the angle of inclination of the rail sections is slightly different. The transverse fitting portion 17 has its rear extremity, viewing Figure 8, shaped to conform with the surface of the composite structure to which it is applied and it is welded thereto, as shown at 18. Another similar transverse fitting portion may be applied opposite the portion 17.

The construction of Figure 8 illustrates the wide adaptability of the invention as in this figure the stock of which the fitting portions 4b and 17 are made is of the same size. In this case if oppositely disposed transverse fitting portions are desired two separate pieces must be used which must be applied at opposite sides of the previously assembled structure. This same principle may be utilized in forming an ordinary railing such as that shown in Figure 1, from which it is apparent that two different sizes of pipe are not essential and the entire railing may be made from pipe of a single size, or the uprights and fitting portions may be made of pipe of one size and the rail sections of pipe of another size. The broad features of the invention may be applied in countless different ways and no attempt has here been made to illustrate or mention any but a few examples.

While it is preferred to form the fitting portions of wrought stock, these portions may, if desired, be cast or otherwise formed, although, as above explained, it is preferred to use wrought stock on account of its superior strength and because of the elimination of the great expense incident to casting. However, for certain purposes cast fitting portions may be desirable and their use if formed in accordance with my invention is contemplated.

The portions of the railing may, if desired, be galvanized in usual manner. Preferably the upright sections are galvanized after the fitting portions have been applied to the uprights.

While I have shown and described certain present preferred embodiments of the invention, it is to be distinctly understood that the same is not limited thereto but may be otherwise variously embodied and practiced within the scope of the following claims.

I claim:

1. A method of making railing, comprising assembing a plurality of railing members, welding the same together, and thereafter assembling with said welded members at least one other railing member to form a railing structure and cover so as to conceal from without the weld between said first mentioned members.

2. A method of making railing, comprising assembling a plurality of railing members at least one of which is hollow, welding said members together within said hollow member, and thereafter assembling with said welded members at least one other railing member to form a railing structure and cooperate with said hollow member to cover so as to conceal from without the weld between said first mentioned members.

3. A method of making railing, comprising assembling a plurality of railing members, welding the same together, and thereafter assembling with said welded members a hollow railing member to form a railing structure and cover so as to conceal from without the weld between said first mentioned members.

4. A method of making railing, comprising assembling a plurality of tubular railing members, welding the same together, and thereafter assembling with said welded members at least one other tubular railing member to form a railing structure and cover so as to conceal from without the weld between said first mentioned members.

5. A method of making railing, comprising interfitting a plurality of railing members at least one of which is hollow and welding said members together within said hollow member in such manner that the weld is invisible from the outside of the railing.

6. A method of making railing, comprising interfitting a plurality of tubular railing members and welding said members together within at least one thereof in such manner that the weld is invisible from the outside of the railing.

7. A method of making railing, comprising assembling a plurality of railing members and joining said members together by deposit welding and with the welding deposit concealed from the exterior of the railing.

8. A method of making railing, comprising assembling and welding together a plurality of pieces of tubing with the welding internally of the railing in such manner that the weld is invisible from the outside of the railing.

9. A method of making railing, comprising shaping a piece of tubing so as to fit on the exterior only of another piece of tubing non-coaxially with respect thereto, fitting said pieces together, and joining said pieces internally of said first mentioned piece in such manner that no visible indication of the joining appears at the outside of the railing.

10. A method of making railing, comprising removing a portion of a piece of tubing so as to enable it to fit on the exterior only of another piece of tubing, fitting said pieces together, and joining said pieces internally of said first mentioned piece in such manner that no visible indication of the joining appears at the outside of the railing.

11. A method of making railing, comprising assembling a plurality of railing members and joining the same by deposit welding with the welding deposit in the finished railing disposed within the confines of the railing members.

12. A method of making railing, comprising making in the wall of a piece of tubing a transverse opening whose diameter is substantially the same as the external diameter of a second piece of tubing, positioning a portion of the second piece of tubing within said opening and joining the pieces together within said first mentioned piece in such manner that no visible indication of the joining appears at the outside of the railing.

13. Railing structure, comprising a plurality of railing members connected together by a welding deposit and at least one other railing member cooperating with said first mentioned members to form the railing structure and cover so as to conceal the welding deposit from the outside of the structure.

14. Railing structure, comprising a plurality of pieces of tubing welded together, the weld being disposed entirely internally of the structure so as to be invisible from the outside of the railing.

15. Railing structure, comprising a plurality of pieces of tubing assembled in non-coaxial relationship and joined together by a welding deposit interiorly of the structure.

16. Railing structure, comprising a plurality of railing members joined by a welding deposit concealed from the exterior of the structure.

17. Railing structure, comprising a plurality of tubular members joined by a welding deposit at the inner surface of one of such members and the outer surface of another thereof.

18. Railing structure, comprising a plurality of railing members having in contact wall portions disposed at an angle to one another and a welding deposit in said angle joining said members together, said welding deposit being concealed from the exterior of the structure.

19. Railing structure, comprising a plurality of tubular members having in contact wall portions disposed at an angle to one another and a welding deposit in said angle joining said members together, said welding deposit being disposed within at least one of said tubular members and concealed from the exterior of the structure.

20. Railing structure, comprising a piece of tubing having a cut away portion and a second piece of tubing having a portion of its exterior surface only in contact with said portion of the first mentioned piece, said pieces being joined together interiorly of the structure, the exterior of the structure being free from any visible indication of the joining.

21. Railing structure, comprising a longitudinally extending tubular rail member and a plurality of tubular supporting members for the rail member spaced therealong and extending transversely with respect thereto, the rail member and supporting members being welded together within the confines of the structure.

WYLIE B. EWING.